United States Patent [19]

Kawate et al.

[11] Patent Number: 4,902,109

[45] Date of Patent: Feb. 20, 1990

[54] ELECTROCHROMIC DEVICE

[75] Inventors: Shinichi Kawate, Tokyo; Ryoji Fujiwara, Kamakura; Etsuro Kishi, Yokohama, all of Japan

[73] Assignee: Canon Kabushiki Kaisha, Tokyo, Japan

[21] Appl. No.: 43,805

[22] Filed: Apr. 29, 1987

[30] Foreign Application Priority Data

| May 2, 1986 | [JP] | Japan | 61-100825 |
| May 2, 1986 | [JP] | Japan | 61-100826 |
| Aug. 22, 1986 | [JP] | Japan | 61-195300 |
| Aug. 25, 1986 | [JP] | Japan | 61-198410 |

[51] Int. Cl.⁴ .............................................. G02F 1/17
[52] U.S. Cl. .................................................... 350/357
[58] Field of Search ...................... 350/355, 356, 357; 340/785

[56] References Cited

PUBLICATIONS

Dautremont-Smith et al., "Electrochromic Cells with Iridium Oxide Display Electrodes", *Solid State Ionics*, Feb. 1981, pp. 13–18.

Gottesfeld, "The Anodic Rhodium Oxide Film: A Two-Color Electrochromic System", *J. Electrochemical Society: Electrochemical Science and Technology*, Feb. 1980, pp. 272–277.

Primary Examiner—Eugene R. LaRoche
Assistant Examiner—Nathan W. McCutcheon
Attorney, Agent, or Firm—Fitzpatrick, Cella, Harper & Scinto

[57] ABSTRACT

An electrochromic device employing a metal oxide film as an oxidative-coloration layer is provided. The metal oxide film is a porous film comprising grains, 50% in number or more of which have a grain size of 1000 to 5000 Å in diameter, and changes its optical density in a range of 0.3 to 0.65 between a bleached state and a colored state. The metal oxide film is prepared by an anodic oxidation process in which alternating potential is continuously applied to a metallic film initially with a smaller amplitude and subsequently with a larger amplitude.

6 Claims, 6 Drawing Sheets

ELECTROCHROMIC DEVICE

FIELD OF THE INVENTION

The present invention relates to an electrochromic (hereinafter often called "EC") device and a process for producing an electrochromic device, and, more particularly, to an EC device comprising a metal oxide film that can show a great optical density change between coloring and bleaching, a process for producing such an EC device, and an EC device of improved boundary face for joining.

DESCRIPTION OF THE PRIOR ART

Conventionally, the EC phenomenon refers to a phenomenon in which a substance takes on a color by the oxidation-reduction reactions when a voltage is applied. Electrochemically coloring and bleaching devices utilizing such an EC phenomenon, namely, EC devices have been expected to be applied in digital displays, X-Y matrix displays, variable ND filters, optical shutters, aperture mechanisms, etc. As EC materials that can takes on a color at the time of the oxidation, the material best available in view of the response speed, stability, lifetime, etc. is presently said to be iridium oxide.

A process for preparing an electrochromic film capable of exhibiting such an EC phenomenon and typically comprised of iridium oxide may include an anodic oxidation process in which alternating potential of a given amplitude is continuously swept to metallic iridium in an electrolyte solution, and a reactive sputtering process in which iridium serves as a target and oxygen is used as a reactive gas.

The preparation of the iridium oxide film by the anodic oxidation process is proposed in J. L. Shay et al., Appl. Phys. Lett. 33 (11), 942 (1978), and the iridium oxide film thereby obtained is called AIROF (Anodic Iridium Oxide Film).

On the other hand, the preparation of the iridium oxide film by the reactive sputtering process is proposed in M. Schiavone et al., Appl. Phys. Lett. 35 (10), 823 (1979), and the iridium oxide film thereby obtained is called SIROF (Sputtered Iridium Oxide Film).

The above anodic oxidation process has an advantage that the film shows a great optical density change between coloring and bleaching in an aqueous electrolyte solution by virtue of the feature that the surface configuration is so porous, and grains are so large, that the film may have a great surface area.

However, in preparation of the AIROF by the conventional anodic oxidation process, it is prepared by continuously sweeping alternating potential with a given amplitude to metallic iridium in an electrolyte solution. Accordingly, preparing the film under the condition of smaller amplitude of the continuously swept potential may result in smaller optical density change between coloring and bleaching of the resulting iridium oxide film, or preparing it under the condition of larger amplitude of the continuously swept potential with an attempt to achieve a great optical density change may disadvantageously cause peeling of the film during its preparation.

In this AIROF, there is another disadvantage originating from the porosity in the surface configuration, exhibiting a phenomenon that, when, for example, applied in an entirely solid type EC device, the optical density change may become very small as compared with the case of a liquid type EC device.

One reason therefor is that, in the case where an insulating layer is provided by vacuum deposition on the film, the joining at the interface between both may become unfit because of the porosity of the surface configuration of AIROF, thereby forming, for example, an interstice therebetween to make difficult the transportation of ions necessary for the coloring and bleaching.

On the other hand, the SIROF has a feature that it comprises finer grains and has higher smoothness of the surface as compared with the AIROF. For this reason, in the case of the SIROF, the joining at the interface with an insulating layer is in so good state that ions can be transported with ease. However, the SIROF has also a disadvantage that the surface area is so small because of its nearly plane surface that the optical density change can not be made great.

To eliminate such a disadvantage, the film may be formed so as to have a rough surface to have a large surface area, by accelerating the film formation rate at the time of sputtering. Even by doing so, however, there, in turn, may be brought about a problem that the optical density in a bleached state becomes high and also the adhesion of the film becomes poor.

SUMMARY OF THE INVENTION

Accordingly, the present invention has been made in consideration of such prior arts, and an object of the invention is to provide, in an anodic oxidation process for preparing a metal oxide film as an oxidative-coloration layer by oxidizing a metallic film, a process for producing an EC device comprising a metal oxide film that can achieve a large optical density change between coloring and bleaching and may be hardly peeled off.

Another object of the present invention is to provide an EC device employing a metal oxide film that can achieve a large optical density change between coloring and bleaching and may be hardly peeled off, produced by the above process.

A further object of the present invention is to provide an electrochromic device that can achieve a greater optical density change and better boundary face joining than the conventional ones, wherein the electrochromic layer typified by the iridium oxide film is constructed by laminating electrochromic films formed respectively by the two type processes of the anodic oxidation process and the sputtering process, making the most of the features, and at the same time compensating the disadvantages, respectively owned by the films independently prepared according to the both processes.

According to an aspect of the present invention, there is provided an electrochromic device employing a metal oxide film as an oxidative-coloration layer, said metal oxide film being a porous film comprising grains, 50% in number or more of which have grain size of 1000 to 5000 Å in diameter.

According to another aspect of the present invention, there is provided an electrochromic device employing a metal oxide film as an oxidative-coloration layer, said metal oxide film changing the optical density thereof in a range of 0.3 to 0.65 between a bleached state and a colored state.

According to still another aspect of the present invention, there is provided an electrochromic device employing a metal oxide layer as an oxidative-coloration layer, said metal oxide film being prepared by an anodic oxidation process in which alternating potential is continuously applied to a metallic film initially with a smaller amplitude and subsequently with a larger amplitude.

According to a further aspect of the present invention, there is provided an electrochromic device employing a metal oxide layer as an oxidative-coloration layer, said metal oxide film being prepared by an anodic oxidation process in which alternating potential is successively applied to a metallic film in a manner divided into a first period, a second period and a third period, and in which the alternating potential is applied such that the lowest negative potential relative to a saturated calomel reference electrode is lower in the first period than said potential in the second period, with shorter application time than that in the second period, and said potential in the third period is lower at least once than the potential in the second period.

According to a still further aspect of the present invention, there is provided an electrochromic device employing a metal oxide layer as an oxidative-coloration layer, said metal oxide film being prepared by an anodic oxidation process in which alternating potential is continuously applied to a metallic film initially with a smaller amplitude, subsequently with an amplitude that can stabilize the film and for a longer period of time, and thereafter with a larger amplitude.

According to still a further aspect of the present invention, there is provided an electrochromic device having an electrochromic layer between counter electrodes, said electrochromic device comprising a color developing layer having a structure that electrochromic films formed respectively by an anodic oxidation process and a sputtering process are laminated.

DETAILED DESCRIPTION OF THE PREFERRED EMBODIMENTS

Specifically, the present invention relates to an electrochromic device employing a metal oxide film as the oxidative-coloring layer, and provides a metal oxide film that can achieve a large optical density change between coloring and bleaching and may be hardly peeled off, according to the production process as described below.

Explanation will be made below specifically, taking an example of an iridium oxide film as the metal oxide film.

The iridium oxide film of the present invention can be prepared according to any of the following processes (1) to (3).

(1) The iridium oxide film is prepared by an anodic oxidation process wherein alternating potential is continuously applied to a metallic iridium film, initially with a smaller amplitude and subsequently with a larger amplitude.

(2) In preparation of the iridium oxide film according to an anodic oxidation process wherein alternating potential is successively applied in a manner divided into three periods comprising a first period, a second period and a third period, there is applied alternating potential such that the lowest negative potential relative to a saturated calomel reference electrode is lower in the first period than the potential in the second period and is applied in a shorter time than in the second period, and, in the third period, the above potential is lower at least once than the potential in the second period.

(3) The iridium oxide film is prepared by continuously applying alternating potential to a metallic iridium film, initially with a smaller amplitude, subsequently with an amplitude that can stabilize the film and for a long period of time, and thereafter with a larger amplitude.

The present invention also provides an electrochromic device characterized by having a structure that electrochromic films prepared respectively by an anodic oxidation process and a sputtering process are laminated.

The present invention will be described below in detail.

Figure 1:
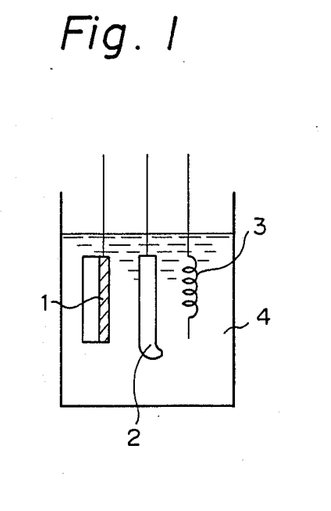
FIG. 1 is an illustration to show an example of a glass cell used in the anodic oxidation of the present invention.
Figure 2:
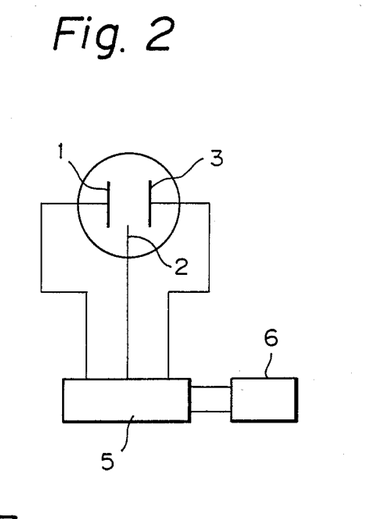
FIG. 2 is an illustration of a driving system for the glass cell.

FIG. 1 is an illustration showing an example of a glass cell used in the anodic oxidation of the present invention. In FIG. 1, the numeral 1 denotes a metallic iridium film formed on a glass substrate 1 provided with ITO; the numeral 2, a saturated calomel reference electrode (hereinafter "SCE"); the numeral 3, a platinum electrode; and the numeral 4, an aqueous solution of $H_2SO_4$. The cell constructed in this manner is driven by a glass cell driving system as shown in FIG. 2 to prepare an iridium oxide film. The numeral 5 denotes a potentiostat, and the numeral 6, a potential sweeper.

Figure 3:
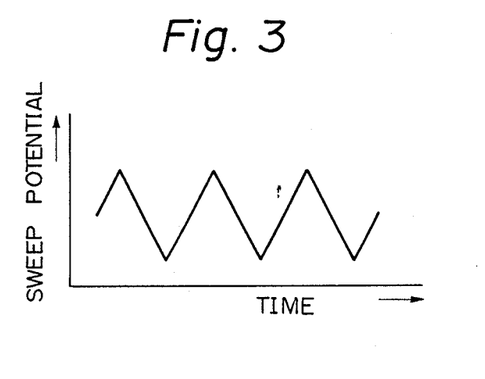
FIG. 3 is a graph showing a wave form of driving potential.

In the present invention, in formation of an iridium oxide film serving as the oxidative-coloration layer of an EC device, triangular wave potential (relative to SCE potential; hereinafter not particularly repeated) as shown in FIG. 3 is swept to the glass cell shown in FIG. 1 by continuously applying it initially with a smaller amplitude, and subsequently with a larger amplitude to effect anodic oxidation of a metallic iridium film corresponding to process (1) mentioned above.

As for the size of the amplitude of the sweep potential, the smaller amplitude to be initially applied may vary depending on the number of times of the sweep, but may be usually of a sweep potential amplitude of $-0.60$ V to $1.50$ V, preferably $-0.15$ to $1.15$ V. The value outside the above may cause the peeling of the film.

The sweep potential amplitude of the alternating potential having a larger amplitude and to be applied subsequently may also vary depending on the times of the sweep, but it may be desirably $-1.50$ V to $2.00$ V, preferably −1.00 V to 1.50 V. The value outside the above may cause the peeling of the film.

As an example of the sweep potential amplitude, the continuous sweep has been conventionally effected using triangular wave potential fixed with the amplitude of −0.25 to 1.25 V (relative to SCE potential) as disclosed in J. L. Shay et al, Applied Physics Letters 33, (11), 942 (1978). However, in the present invention, it is made smaller at an initial stage, and larger at a subsequent stage, thereby obtaining an iridium oxide film that can show a great optical density change.

In the present invention, the application of the alternating potential may not be limited to the sweep of the optical wave potential, and the iridium oxide film having the same performance can be obtained by using a sine wave or a rectangular wave, or a combination of these. Same results can be also obtained even by use of an aqueous solution of an acid other than sulfuric acid, or a neutral salt, in the glass cell.

In the present invention, the metal oxide film that can show a great optical density difference between coloring and bleaching and may be hardly peeled can be also prepared by use of process (2) mentioned above.

Namely, the alternating potential is successively applied to a metallic iridium film in a manner divided into a first period, a second period and a third period.

Here, a feature is that the lowest negative potential relative to SCE is set as follows:

Here is carried out an anodic oxidation process wherein the above potential in the first period is lower than the potential in the second period and is applied in a sufficiently shorter time than in the second period, and, in the third period, the above potential is lower at least once than the potential in the second period, whereby an iridium oxide film that can show a great optical density change can be prepared.

The sweep potential amplitude of the alternating potential to be applied in the first period may vary depending on the times of the sweep, but may be −0.60 V to 1.25 V, preferably 0.50 V to 1.20 V.

The sweep potential amplitude of the alternating potential to be applied in the second period may be preferably −0.25 V to 1.25 V as in the prior art.

The sweep potential amplitude of the alternating-potential to be applied in the third period may also vary depending on the number of the sweep, but may be −1.50 V to 2.00 V, preferably −1.00 V to 1.50 V.

In the present invention, the sweep of potential in the first period may be carried out several times, and it is desired to be carried out preferably 2 to 5 times.

As an example of the sweep potential amplitude, the continuous sweep has been conventionally effected using triangular wave potential fixed with the amplitude of −0.25 to 1.25 V (relative to SCE potential) as disclosed in J. L. Shay et al, Applied Physics Letters 33, (11), 942 (1978). However, in the present invention, as compared with the prior art, the lowest negative potential relative to SCE is made smaller in the initial first period, and, in the subsequent third period, it is made lower at least once, but the amplitude is made larger, than the potential in the second period, thereby obtaining an iridium oxide film that can show a great optical density change.

In the present invention, the application of the alternating-current potential may not be limited to the sweep of the triangular wave potential, and the iridium oxide film having the same performance can be obtained by using a sine wave or a rectangular wave, or a combination of these.

Same results can be also obtained even by use of an aqueous solution of an acid other than sulfuric acid, or a neutral salt, in the glass cell.

The metal oxide film of the present invention was found to be also obtainable by use of process (3) mentioned above.

Namely, the anodic oxidation of a metalic iridium film is carried out by continuously applying alternating potential, initially with a smaller amplitude, and thereafter with a larger amplitude.

As for the size of the amplitude of the sweep potential, the smaller amplitude to be initially applied may vary depending on the times of the sweep, but may be usually of a sweep potential amplitude of −0.60 V to 1.50 V, preferably −0.15 to 1.15 V. The value outside the above may cause the peeling of the film.

The amplitude of the sweep potential applied for the purpose of stabilizing the film is desirably −0.60 V to 1.50 V, preferably −0.25 V to 1.25 V. The value outside the above may result in no stabilization of the film and also may cause the peeling of the film at the time of the sweep subsequently carried out with a larger potential amplitude. The times of the sweep is desirably 50 times or more, preferably 100 to 150 times. The times less than 50 times may not result in the stabilization of the film and may cause the peeling of the film at the time of the sweep subsequently carried out with a larger potential amplitude, or, even if oxidized without causing the peeling of the film, the optical density change between coloring and bleaching may be completed as it remains small.

The sweep potential amplitude of the current potential to be thereafter applied with a larger amplitude may also vary depending on the times of the sweep, but desirably may be −1.50 V to 2.00 V, preferably −1.00 V to 1.50 V. The value outside the above may cause the peeling of the film.

As an example of the sweep potential amplitude, the continuous sweep has been conventionally effected using triangular wave potential fixed with the amplitude of −0.25 to 1.25 V (relative to SCE potential) as disclosed in J. L. Shay et al, Applied Physics Letters 33, (11), 942 (1978). However, in the present invention, as compared with the prior art, the alternating potential is swept initially with a smaller amplitude, subsequently with an amplitude that can stabilize the film, and thereafter with a larger amplitude, thereby obtaining an iridium oxide film that can show a great optical density change.

In the present invention, the application of the alternating potential may not be limited to the sweep of the triangular wave potential, and the iridium oxide film having the same performance can be obtained by using a sine wave or a rectangular wave, or a combination of these. Same results can be also obtained even by use of an aqueous solution of an acid other than sulfuric acid, or a neutral salt, in the glass cell.

In the present invention, the metallic film may preferably be a metallic iridium film, but may not necessarily be limited to this, and there may be used metalic films of different kind. Accordingly, the metal oxide film can be prepared as an iridium oxide film or other metal oxide films.

The film formed by any of the above three processes has a difference in the surface configuration of the film as compared with a film formed by a conventional process. The film prepared by the conventional process has a grain size of 500 to 1000 Å in diameter, while, in the film according to the present invention, 50 percents in number or more of the grains are formed and distributed with the size of 1000 to 5000 Å (in most part, 2000 to 5000 Å) in diameter. (These grains were observed by magnifying to 20,000 magnification with use of a scanning electron microscope (SEM) T-2000, produced by Nippon Denshi K.K.). Also, the film is porous. By virtue of the film having such a form, it can be a film capable of showing a great optical density change between coloring and bleaching.

The metal oxide film according to the present invention has been made to show the value of the optical density (hereinafter "OD") kept substantially constant at the time of coloring and the value OD lowered at the time of bleaching, so that the difference of OD value ($\Delta$OD) can be as great as possible. Specifically, the film is characterized by showing the $\Delta$OD of approximately 0.3 to 0.65.

In the process for the preparation of the metal oxide film of the present invention, it is principally aimed to provide a film that may be hardly peeled in the course the alternating potential is applied with the initial smaller amplitude, and to provide a film that can show a great optical density change between coloring and bleaching in the course the alternating potential is applied with a larger amplitude. Accordingly, the alternating potential may be applied in the manner that it is shifted gradually as a whole from a smaller amplitude to a larger amplitude. In other words, not limited to the above three processes, it may be applied in the manner, for example, that the sweep potential amplitude of the alternating potential applied in a first period is $-0.25$ to $1.20$ V; in a second period, $-0.50$ to $1.25$ V; in a third period, $-0.25$ to $1.20$ V; in a fourth period, $-0.7$ to $1.35$ V; in a fifth period, $-0.6$ to $1.40$ V; and in a sixth period, $-1.0$ to $-1.5$ V.

Even when there is interposed a portion where the sweep is effected with a sweep potential amplitude smaller than an anterior period, the object of the present invention can be achieved if the alternating potential is controlled to be applied with a larger amplitude as a whole.

Figure 9:
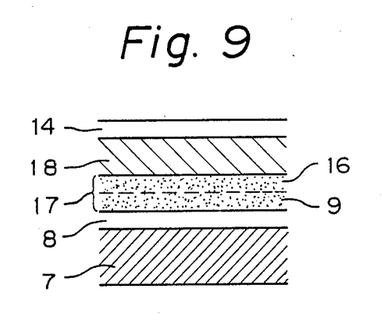
FIG. 9 and FIG. 10 are cross-sections showing two examples of entirely solid type electrochromic devices according to the present invention.
Figure 10:
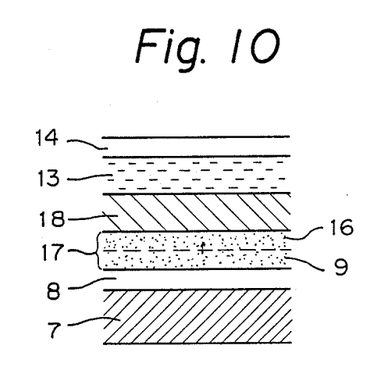

The electrochromic device shown in FIG. 9 comprises a first electrode 8 comprising a transparent conductive film, an electrochromic layer 17 which is a color developing layer on the anode side, an insulating layer 18 comprising a dielectric film, and a second electrode 14 comprising a conductive film, which are successively laminated on a transparent substrate 7. The electrochromic device shown in FIG. 10 is one in which a second electrochromic layer 13 which is a color developing layer at the cathode side is further laminated between the insulating layer 18 and the second electrode 14 in the structure shown in FIG. 9.

A process for formation of AIROF and SIROF of the color developing layer at the anode side, having double layer structure will be described specifically. On a glass substrate provided with a transparent conductive film, a metallic iridium film is formed by a sputtering process to have a film thickness of 100 to 400 Å, and this metallic iridium film is subjected to anodic oxidation by continuously sweeping an alternating potential in an electrolyte solution to prepare an iridium oxide film (AIROF) preferably having a film thickness of 500 to 2000 Å.

Thereafter, on this AIROF, an iridium oxide film (SIROF) is prepared by the reactive sputtering process in an oxygen/hydrogen-mixed atmosphere using the metallic iridium as a target, preferably under gas pressure of 0.1 to 0.4 Torr and at a film formation rate of 3 Å/min or less. This SIROF may preferably have a film thickness of 100 to 300 Å in order to reduce the porosity of the surface of AIROF to a certain degree without losing the transparency of SIROF itself.

This SIROF is prepared in such a way that the film formation rate may be smaller under higher pressure as compared with the pressure of about $10^{-2}$ Torr used in a usual sputtering process. Accordingly, the joined face between AIROF and SIROF is in a good state without giving any interstice, and the surface of SIROF is so smooth that the joining with the insulating layer can be also in a good state. Thus, an anode side color developing layer of double layer structure can be formed, making the most of the features inherent in the AIROF and SIROF.

Accordingly, there can be formed an electrochromic device that can show a great optical density change and have joined faces in a good state.

In the structure of the present invention, the substrate 7 may be generally formed by a glass sheet, but, not limited to the glass sheet, may be formed by any of colorless transparent sheets such as a plastic sheet and an acrylic sheet. Regarding also its position, it may be provided not below the first electrode 8, but on the second electrode 14, or on both sides depending on the purpose (for example, for the purpose of providing a protective cover). However, depending on the use thereof, the second electrode 14 is required to be a transparent conductive film, or both the electrodes on both sides are required to be transparent conductive films. When the electrodes on both sides are transparent electrodes, a transparent type device can be produced. The insulating layer 18 may be not only a dielectric, but also a solid electrolyte or the like.

When the electrodes are formed as transparent conductive films, there may be used ITO films (formed by doping tin oxide ($SnO_2$) in indium oxide ($In_2O_3$)) or NESA films.

The insulating layer 18 comprising a dielectric is formed by using oxides typified by silicon oxide (SiO, $SiO_2$), zirconium oxide ($ZrO_2$), tantalum pentoxide ($Ta_2O_5$), etc., or fluorides typified by lithium fluoride (LiF), magnesium fluoride ($MgF_2$), etc.

The electrochromic layer 17 of the present invention is provided on the anode side to have the structure that an SIROF or a sputtered film 16 of nickel oxide ($NiO_x$), cobalt oxide ($CoO_x$) or the like is laminated on AIROF 9.

In the electrochromic layer 13 provided on the cathode side, tungsten oxide ($WO_2$, $WO_3$). molybdenum oxide ($MoO_2$, $MoO_3$), vanadium pentoxide ($V_2O_5$), etc. may be used.

EXAMPLES

The present invention will be described below by Examples.

EXAMPLE 1-1

A method according to Process (1)

On a glass sheet provided with an ITO film, a metallic iridium film was formed by sputtering to have a thickness of 300 to 400 Å. On this electrode, continuous sweep of a triangular wave potential was carried out in an aqueous solution of 0.01 N $H_2SO_4$ at a sweep rate of 0.1 V/sec. The amplitude of the triangular wave at that time was stepwise increased as shown in Table 1-1 to carry out the sweep. As a result, it was possible to prepare an iridium oxide film that can show a great optical density change without causing the peeling of the film.

TABLE 1-1

|  | Sweep potential amplitude (V) | Number of sweep | |
|---|---|---|---|
| First step | −0.15 to 1.15 | 1st to | 5th |
| Second step | −0.25 to 1.25 | 6th to | 100th |
| Third step | −0.50 to 1.25 | 101st to | 105th |
| Fourth step | −0.70 to 1.35 | 106th to | 110th |
| Fifth step | −1.00 to 1.50 | 111st to | 180th |

Namely, initial oxidation was slowly effected in the first step with a smaller amplitude than that of a prior art (−0.25 to 1.25 V). Subsequently, a stable oxidized film was allowed to grow in the second step where an amplitude employed in prior arts is used, and thereafter the amplitude was made larger, whereby it was possible to make the optical density change greater, in particular, to make smaller the density at the time of bleaching.

Figure 4:
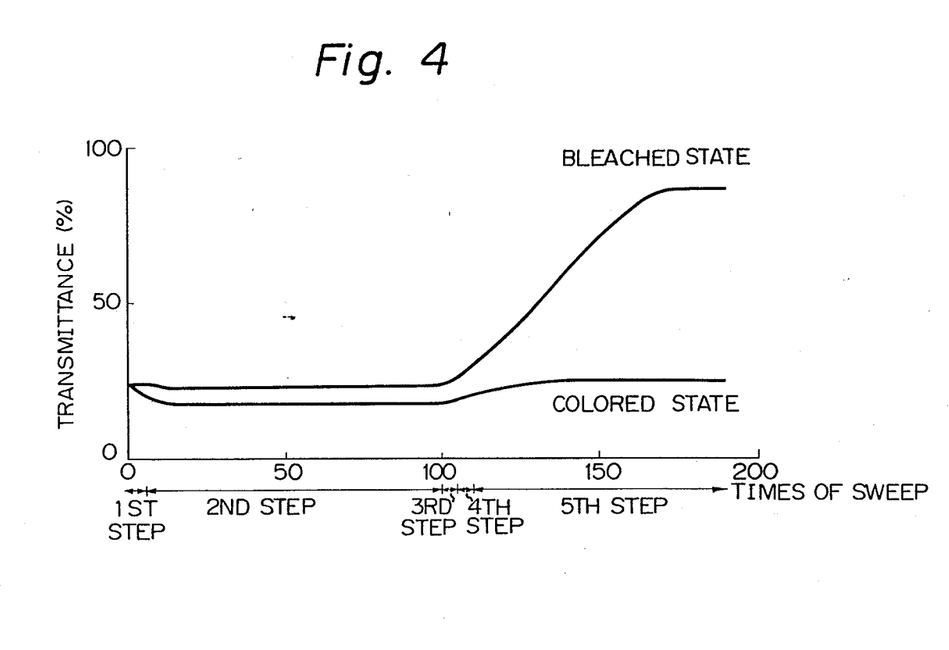
FIG. 4 is a graph showing the relationship between the times of sweep and the density change of an iridium oxide film prepared in Example 1-1.

The number of sweep and the optical density change (a maximum value and a minimum value are shown) occurred in the film when prepared under the conditions shown in Table 1-1 are set out in FIG. 4. The film grew while repeating coloring and bleaching, and the optical density change came to a constant value at the sweep exceeding 175 times.

The final optical density change at this time was such that $\Delta OD=0.63$, with remarkable increase as compared with the density change $\Delta OD=0.22$ according to the conventional stationary amplitude (−0.25 to 1.25 V, 450 times).

Figure 5:
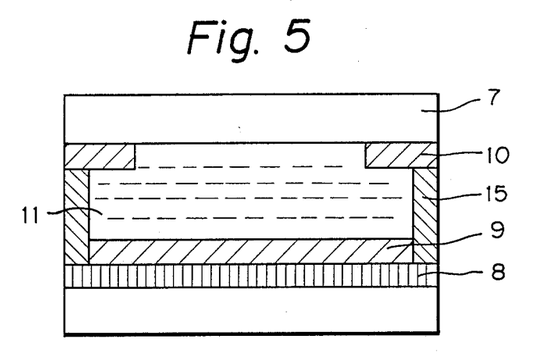
FIG. 5 is a cross-section showing the constitution of a liquid type EC device.

Thus, there was prepared a liquid type EC device using the iridium oxide film prepared on the glass substrate provided with the ITO film. The structure of this liquid type device is shown in FIG. 5. In FIG. 5, the numeral 7 denotes a glass substrate; 8, a transparent electrode (ITO); 9, an iridium oxide film; 10, a counter electrode made of, for example, platinum; 11, an aqueous solution of 0.1 N $H_2SO_4$; and 15, a sealing member. On this EC device, with the counter electrode 10 as a reference, a direct-current voltage of +1.5 V was applied between the transparent electrode 8 and the counter electrode 10. As a result, there was shown an optical density change of $\Delta OD=0.30$ in 250 msec.

The final optical density change shown in FIG. 4 was obtained as a result of carrying out the sweep with a larger amplitude than that of the prior art, but, after the optical density of the film has become constant, a similar optical density change was obtained even by the sweep with a potential amplitude of the prior art (−0.25 to 1.25 V).

EXAMPLE 1-2

Figure 6:
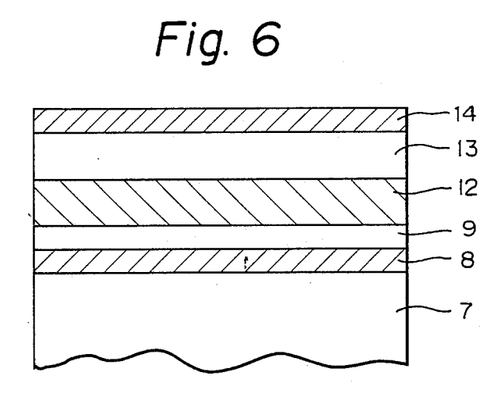
FIG. 6 is a cross-section showing the constitution of a solid type EC device.

As shown in FIG. 6, on an iridium oxide film 9 prepared in the same manner as in Example 1-1 on a glass substrate 7 provided with ITO, a $Ta_2O_5$ film with a film thickness of 3000 Å, and further a $WO_3$ film with a film thickness of 4000 Å as a reductive-coloration layer, were successively formed by an electron beam process, and finally an upper ITO transparent electrode 14 was formed by a reactive ion plating process to obtain an entirely solid EC device. On this EC device, with the upper transparent electrode 14 as a reference, a direct-current voltage of +1.5 V was applied between the upper transparent electrode 14 and the transparent electrode 8. As a result, there was shown an optical density change of $\Delta OD=0.37$ in 250 msec.

EXAMPLE 2-1

A method according to Process (2)

On a glass sheet provided with an ITO film, a metallic iridium film was formed by sputtering to have a thickness of 300 to 400 Å. On this electrode, continuous sweep of a triangular wave potential was carried out in an aqueous solution of 0.01 N $H_2SO_4$ at a sweep rate of 0.1 V/sec. The amplitude of the triangular wave potential at that time was set as shown in Table 2-1 to carry out the sweep. As a result, it was possible to prepare an iridium oxide film that can show a great optical density change without causing the peeling of the film.

TABLE 2-1

|  |  | Sweep potential amplitude (V) | Number of sweep | |
|---|---|---|---|---|
| First period |  | −0.50 to 1.20 | 1st to | 3rd |
| Second period |  | −0.25 to 1.25 | 3rd to | 50th |
| Third period | (1) | −0.50 to 1.25 | 51st to | 55th |
|  | (2) | −0.70 to 1.35 | 56th to | 60th |
|  | (3) | −1.00 to 1.50 | 61st to | 100th |

Namely, as shown in Table 2-1, in respect of the lowest negative potential relative to SCE, the potential in the first period is lower than the above potential in the second period and also the sweep was carried out three times which are sufficiently fewer as compared with the second period, so that the optical density at the time of bleaching may be made lower without peeling of the film. In the subsequent second period, the sweep at the potential of the prior art (−0.25 to 1.25 V) was carried out to allow an oxide film to grow, and, in the third period, the sweep was carried out at the potential such that the peak values at the negative side and the positive side are gradually increased, whereby it was possible to increase the optical density change of the film.

Figure 7:
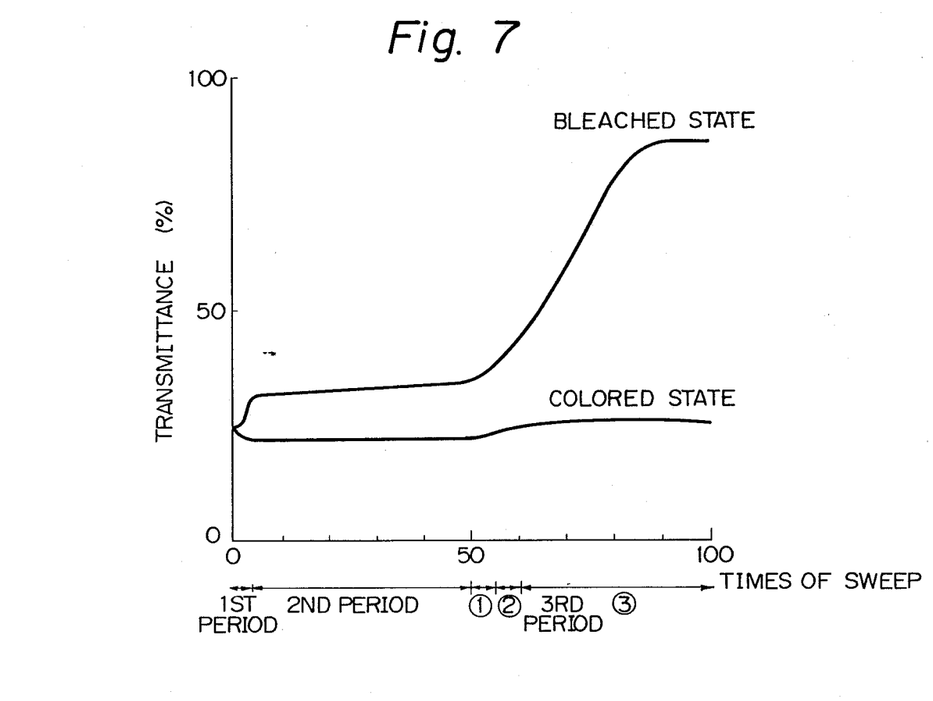
FIG. 7 and FIG. 8 are graphs showing the relationship between the number of sweep and the density change of an iridium oxide film prepared in Example 2-1 and Example 3-1, respectively.

The times of sweep and the optical density change (a maximum value and a minimum value are shown) occurred in the film when prepared under the conditions shown in Table 2-1 are set out in FIG. 7. The film grew while repeating coloring and bleaching, and the density change came to a constant value at the sweep exceeding 95 times.

The final optical density change at this time was such that $\Delta OD=0.63$, with remarkable increase as compared with the density change $\Delta OD=0.22$ according to the conventional constant amplitude (−0.25 to 1.25 V, 450 times).

Thus, there was prepared a liquid type EC device using the iridium oxide film prepared on the glass substrate provided with the ITO film. The structure of this liquid type device is shown in FIG. 5. In FIG. 5, the numeral 7 denotes a glass substrate; 8, a transparent electrode (ITO); 9, an iridium oxide film; 10, a counter electrode made of, for example, platinum; 11, an aqueous solution of 0.1 N $H_2SO_4$; and 15, a sealing member. On this EC device, with the counter electrode 10 as a reference, a direct-current voltage of +1.5 V was applied between the transparent electrode 8 and the counter electrode 10. As a result, there was shown a density change of $\Delta OD=0.30$ in 250 msec.

The final density change shown in FIG. 7 was obtained as a result of carrying out the sweep with a larger amplitude than that of the prior art, but, after the oxidation of the film was completed, a similar optical density change was obtained even by the sweep with a potential amplitude of the prior art (−0.25 to 1.25 V).

EXAMPLE 2-2

As shown in FIG. 6, on an iridium oxide film 9 prepared in the same manner as in Example 2-1 on a glass substrate 7 provided with ITO, a $Ta_2O_5$ film with a film thickness of 3000 Å, and further a $WO_3$ film with a film thickness of 4000 Å as a reductive-coloration layer, were successively formed by an electron beam process, and finally an upper ITO transparent electrode 14 was formed by a reactive ion plating process to obtain an entirely solid EC device. On thid EC device, with the upper transparent electrode 14 as a reference, a direct-current voltage of +1.5 V was applied between the upper transparent electrode 14 and the transparent electrode 8. As a result, there was shown an optical density change of $\Delta OD=0.37$ in 250 msec.

EXAMPLE 3-1

A method according to Process (3)

On a glass sheet provided with an ITO film, a metallic iridium film was formed by sputtering to have a thickness of 300 to 400 Å. On this electrode, continuous sweep of a triangular wave potential was carried out in an aqueous solution of 0.01 N $H_2SO_4$ at a sweep rate of 0.1 V/sec. The amplitude of the triangular wave potential at that time was stepwise increased as shown in Table 3-1 to carry out the sweep. As a result, it was possible to prepare an iridium oxide film that can show a great optical density change without causing the peeling of the film.

TABLE 3-1

| | Sweep potential amplitude (V) | Number of sweep | |
|---|---|---|---|
| First step | −0.15 to 1.15 | 1st to | 10th |
| Second step | −0.25 to 1.25 | 11th to | 140th |
| Third step | −0.50 to 1.25 | 141st to | 150th |
| Fourth step | −0.70 to 1.35 | 151st to | 160th |
| Fifth step | −1.00 to 1.50 | 161st to | 230th |

Namely, initial oxidation was slowly effected in the first step with a smaller amplitude than that of a prior art (−0.25 to 1.25 V). Subsequently, a stable oxidized film was allowed to grow in the second step where a conventional amplitude is used, and thereafter the amplitude was made larger, whereby it was possible to make the optical density change greater, in particular, to make smaller the density at the time of bleaching.

Figure 8:
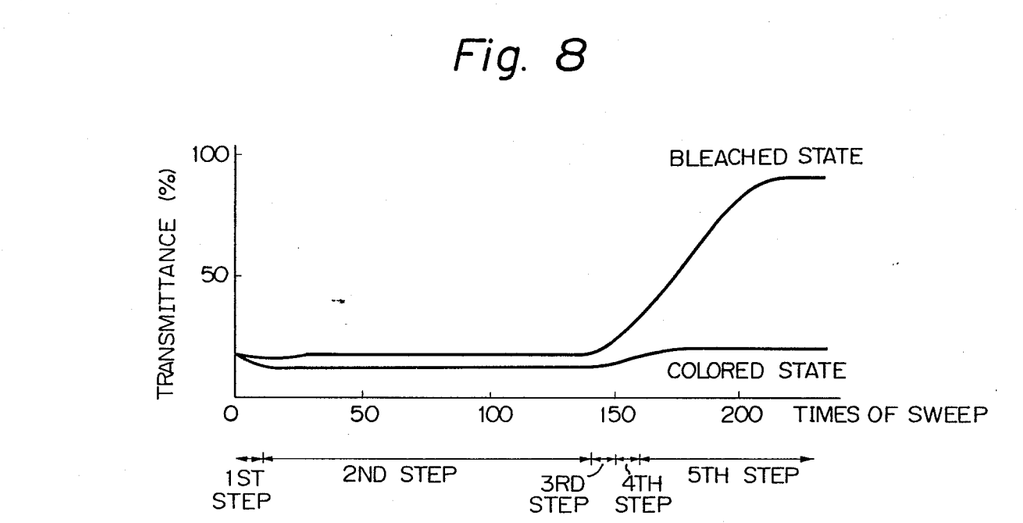

The number of sweep and the optical density change (a maximum value and a minimum value are shown) occurred in the film when prepared under the conditions shown in Table 3-1 are set out in FIG. 8. The film grew while repeating coloring and bleaching, and the optical density change came to a constant value at the sweep exceeding 220 times.

The final optical density change at this time was such that $\Delta OD=0.65$, with remarkable increase as compared with the density change $\Delta OD=0.22$ according to the conventional stationary amplitude (−0.25 to 1.25 V, 450 times).

Thus, there was prepared a liquid type EC device using the iridium oxide film prepared on the glass substrate provided with the ITO film. The structure of this liquid type device is shown in FIG. 5. In FIG. 5, the numeral 7 denotes a glass substrate; 8, a transparent electrode (ITO); 9, an iridium oxide film; 10, a counter electrode made of, for example, platinum; 11, an aqueous solution of 0.1 N $H_2SO_4$; and 15, a sealing member. On this EC device, with the counter electrode 10 as a reference, a direct-current voltage of +1.5 V was applied between the transparent electrode 8 and the counter electrode 10. As a result, there was shown an optical density change of $\Delta OD=0.32$ in 250 msec.

The final optical density change shown in FIG. 8 was obtained as a result of carrying out the sweep with a larger amplitude than that of the prior art, but, after the oxidation of the film was completed, a similar density change was obtained even by the sweep with a potential amplitude of the prior art (−0.25 to 1.25 V).

EXAMPLE 3-2

As shown in FIG. 6, on an iridium oxide film 9 prepared in the same manner as in Example 3-1 on a glass substrate 7 provided with ITO, a $Ta_2O_5$ film with a film thickness of 3000 Å, and further a $WO_3$ film with a film thickness of 4000 Å as a reductive-coloration layer, were successively formed by an electron beam process, and finally an upper ITO transparent electrode 14 was formed with a film thickness of 2000 Å by a reactive ion plating process to obtain an entirely solid EC device. On this EC device, with the upper transparent electrode 14 as a reference, a direct-current voltage of +1.5 V was applied between the upper transparent electrode 14 and the transparent electrode 8. As a result, there was shown an optical density change of $\Delta OD=0.39$ in 250 msec.

EXAMPLE 4-1

Reference will be made to FIG. 9 illustrating the structure of another embodiment of the present invention.

An AIROF 9 was first formed on a glass substrate 7 provided with an ITO film.

FIG. 1 is an illustration showing an example of a glass cell used in the anodic oxidation of the present invention, wherein the numeral 1 denotes a metallic iridium film formed by sputtering on a glass substrate 1 provided with ITO; the numeral 2, a saturated calomel reference electrode (hereinafter "SCE"); the numeral 3, a platinum electrode; and the numeral 4, an aqueous solution of 0.1 N $H_2SO_4$. The cell constructed in this manner is driven by a glass cell driving system as shown in FIG. 2 to prepare an iridium oxide film. The iridium oxide film (AIROF), having a film thickness of 1500 Å, was prepared by carrying out the sweep of the amplitude of the triangular wave potential shown in FIG. 3 (relative to SCE potential; hereinafter not particularly repeated), to the glass cell shown in FIG. 2 with use of the sweeper 6, at the rate of 0.1 V/sec and with stepwise increase of the sweep in the manner as shown in Table 4-1.

Subsequently, a SIROF 16 was formed on this AIROF by the reactive sputtering process to have a film thickness of 200 Å, under the conditions such that a double-pole type sputtering system was evacuated to have a base pressure of $2.0 \times 10^{-6}$ Torr, followed by introduction of oxygen as a reactive gas to carry out the film formation under pressure of 0.1 Torr, RF power of 50 W and at the film formation rate of 1.8 Å/min.

Further deposited thereon by the electron beam process were a $Ta_2O_5$ film 18 as an insulating layer at the deposition rate of 1.5 Å/sec to have a film thickness of 3000 Å and, successively thereon, a transparent Au film as a second electrode 14, thereby producing an electrochromic device as shown in FIG. 9.

To this device, with a first electrode 8 as a reference, a direct-current voltage of +1.5 was applied between the first electrode 8 and the second electrode 14. As a result, there was shown an optical density change of $\Delta OD = 0.35$ ($\Delta OD$ represents the difference in optical density) in 250 msec. The present invention has achieved increased density change as compared with $\Delta OD = 0.29$ in the case of a similar device wherein the anode side color developing layer 17 in FIG. 9 was replaced with an SIROF of 1700 Å thick prepared under the same conditions as for the film 16 in Example 4-1.

TABLE 4-1

| | Sweep potential amplitude (V) | Number of sweep | |
|---|---|---|---|
| First step | −0.15 to 1.15 | 1st to | 5th |
| Second step | −0.25 to 1.25 | 6th to | 100th |
| Third step | −0.50 to 1.25 | 101st to | 105th |
| Fourth step | −0.70 to 1.35 | 106th to | 110th |
| Fifth step | −1.00 to 1.50 | 111th to | 180th |

EXAMPLE 4-2

An AIROF 9 was formed on a glass substrate 7 provided with an ITO film 8 under the same conditions as in Example 4-1. Subsequently, using the reactive sputtering process, a film 16 comprising $NiO_x(OH)$ was laminated thereon. The film formation was carried out by introducing a mixed gas of $Ar-O_2-H_2$ system (flow ratio: 1:4:8) under a pressure of 0.1 Torr, an RF power of 150 W and a film formation rate of 1.0 Å/sec to have a film thickness of 300 Å.

Successively further deposited thereon by the electron beam process were a $Ta_2O_5$ film 18 at a deposition rate of 1.5 Å/sec to have a thickness of 3000 Å, and on it, a $WO_3$ film as a cathode side color developing layer at a deposition rate of 13 Å/sec to have a thickness of 3000 Å, and further on it, a semitransparent Au film as a second electrode 14 to have a thickness of 300 Å, thereby producing an electrochromic device as shown in FIG. 10.

To this device, with a first electrode 8 as a reference, a direct-current voltage of +1.5 was applied between the first electrode 8 and the second electrode 14. As a result, there was shown a density change of $\Delta OD = 0.48$ in 250 msec. The present invention has achieved increased optical density change as compared with $\Delta OD = 0.40$ in the case of a similar device wherein the anode side color developing layer 17 in FIG. 10 was replaced with an SIROF of 1800 Å thick prepared under the same conditions as for the film 16 in Example 4-2.

Effect of the Invention

As described in the foregoing, according to the process of the present invention, a metal oxide film that can show a great color change without peeling of the film can be obtained by the anodic oxidation process wherein the sweep of alternating potential is carried out initially with a smaller amplitude and thereafter with a larger amplitude. Also, employment of the resulting metal oxide film in an oxidative-coloration layer of an EC device makes it possible to provide an EC device that can show a great optical density change.

A metal oxide film that can show a great color change without peeling of the film can be also obtained by the anodic oxidation process wherein, in respect of the lowest negative potential relative to SCE, the alternating-current is applied in the manner that the above potential in the first period is lower than the above potential in the second period, with the application time shorter than that in the second period, and the above potential in the third potential is lower at least once than the potential in the second period.

Also, employment of the resulting metal oxide film in an oxidative-coloration layer of an EC device makes it possible to provide an EC device that can show a great optical density change.

In particular, sweeping several times the above potential in the first period, the time for preparing a film capable of showing the same optical density change can be shortened as compared with the case where the above potential was not swept.

According to another process for producing the anodically oxidized film of the present invention, a metal oxide film that can show a great optical density change without peeling of the film can be obtained by the anodic oxidation process wherein an alternating potential is continuously swept initially with a smaller amplitude, subsequently with an amplitude that can stabilize the film and for a long period of time, and thereafter with a larger amplitude. Also, employment of the resulting metal oxide film in an oxidative coloration layer of an EC device makes it possible to provide an EC device that can show a great optical density change.

Still further, making the color developing layer to have the structure that an electrochromic film prepared by a sputtering process is laminated on an electrochromic film prepared by the anodic oxidation process, it is possible to provide an electrochromic device that can show a greater optical density change and have a better boundary interface than in the conventional devices.

What is claimed is:

1. An electrochromic device employing a metal oxide film layer as an oxidative-coloration layer, said metal oxide film layer being prepared by an anodic oxidation process which comprises:
   applying alternating potentials continuously to a metallic film layer during a first period and at least one subsequent period,
   wherein the step of applying alternating potentials includes the step of applying a first potential at a first amplitude during said first period and applying a second potential at a second amplitude during said at least one subsequent period, said second amplitude being larger than said first amplitude.

2. The electrochromic device according to claim 1, wherein said metal oxide film is an iridium oxide film.

3. An electrochromic device employing a metal oxide film layer as an oxidative-coloration layer, said metal oxide film layer being prepared by an anodic oxidation process which comprises:
   applying different alternating potentials successively to a metallic film during a first period, a second period and a third period,
   wherein a first alternating potential is applied during the first period, a second alternating potential is applied during the second period, the lowest potential of said second alternating potential being higher than the lowest potential of said first alternating potential and the second period being longer in time than said first period, and a third alternating potential is applied during the third period, the lowest potential of said third alternating potential being lower than the lowest potential of said second alternating potential.

4. The electrochromic device according to claim 3, wherein said metal oxide film is an iridium oxide film.

5. An electrochromic device employing a metal oxide film layer as an oxidative-coloration layer, said metal oxide film layer being prepared by an anodic oxidation process which comprises:

applying alternating potentials continuously to a metallic film layer during a first period, a second period and a third period, wherein the step of applying alternating potentials includes the step of applying a first potential at a first amplitude during said first period, applying a second potential at a second amplitude during said second period, said second amplitude capable of stabilizing the metal oxide film layer and said second period being for a longer period of time than said first period, and said step of applying alternating potentials further includes applying a third potential at a third amplitude during said third period, said third amplitude being larger than said second amplitude.

6. The electrochromic device according to claim 5, wherein said metal oxide film is an iridium oxide film.

* * * * *